United States Patent [19]
Karlsson

[11] 4,304,218
[45] Dec. 8, 1981

[54] SOLAR ENERGY COLLECTOR

[76] Inventor: Jon Karlsson, Götalandsvägen 194, S-125 55 Älvsjö, Sweden

[21] Appl. No.: 69,506

[22] Filed: Aug. 24, 1979

[51] Int. Cl.³ ............................ F24J 3/02; E06B 3/32; G02B 17/00
[52] U.S. Cl. .................................. 126/419; 126/425; 126/438; 126/450; 160/107; 350/258
[58] Field of Search ............... 126/419, 424, 425, 438, 126/439, 450, 451; 350/263, 259, 258; 160/107, 168, 171, 173, 176, 178 R

[56] References Cited

U.S. PATENT DOCUMENTS

| | | | |
|---|---|---|---|
| 2,281,071 | 4/1942 | Knudsen | 160/107 |
| 2,857,634 | 10/1958 | Garbade et al. | 126/450 |
| 3,048,375 | 8/1962 | Walker | 126/432 |
| 3,105,486 | 10/1963 | Glenn | 126/419 |
| 3,162,189 | 12/1964 | Small et al. | 126/425 |
| 3,247,840 | 4/1966 | Chambers et al. | 126/425 |
| 4,002,159 | 1/1977 | Angilletta | 160/168 R |
| 4,026,269 | 5/1977 | Stelzer | 126/438 |
| 4,079,725 | 3/1978 | Chadick | 126/438 |
| 4,095,369 | 6/1978 | Posnansky | 126/438 |
| 4,143,640 | 3/1979 | Pierce | 126/438 |

*Primary Examiner*—Daniel J. O'Connor
*Attorney, Agent, or Firm*—Curtis Ailes

[57] ABSTRACT

The solar collector comprises a plurality of direction adjustable elongated parabolic reflectors arranged side by side. Along the focus of the reflectors are tubes for a heat collecting medium. The tubes are to be connected to heat exchangers or the like.

Each reflector consists of reflector wall portions movably connected to each other and operable from an open parabolic reflector position to a non-reflector position entirely enclosing the tubes, and forming a relatively flat structure resembling a venetian blind slat.

13 Claims, 4 Drawing Figures

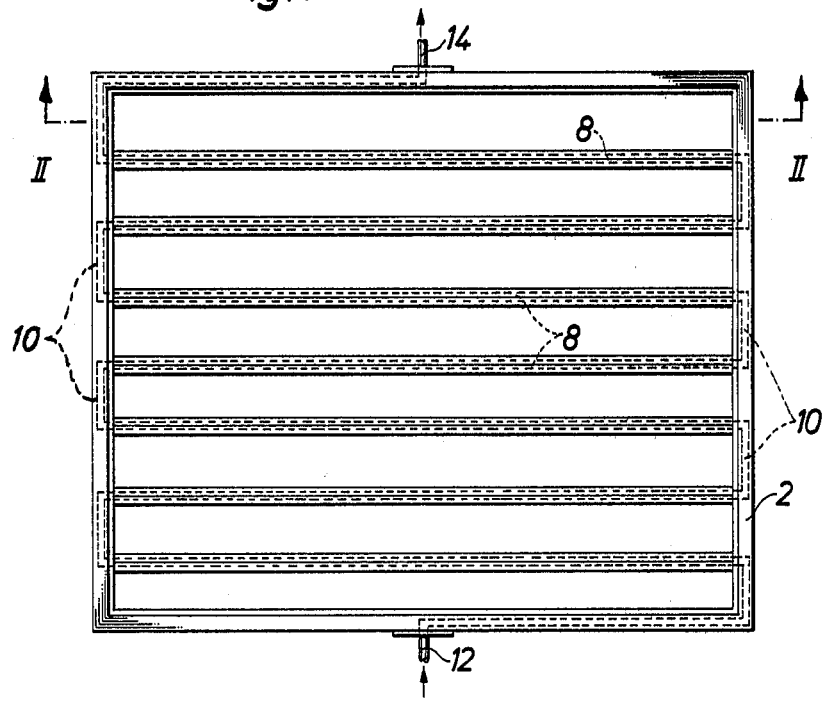
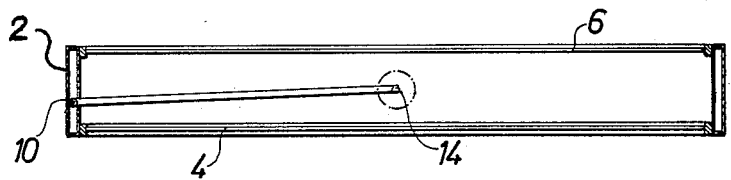
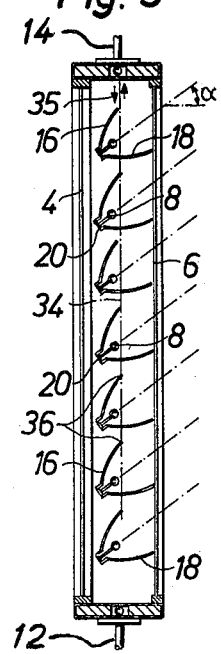

SOLAR ENERGY COLLECTOR

The present invention relates to a solar collector including a plurality of elongated thin-walled reflectors arranged side by side, adjustable in direction, and each designed to reflect incident radiation towards a longitudinal focus along which conveying means for a liquid heat transferring medium extends, said conveying means being connected to a heat collecting device.

Through e.g. U.S. Pat. Nos. 3,847,136, 4,000,734, and 4,079,725 and German Offenlegungsschrift No. 25 33 530 solar collectors are known, which comprise a plurality of elongated parabolic reflectors arranged direction adjustable side by side. Along the focus of the reflectors a tube for liquid heat transferring medium extends, against which the sun radiation is thus reflected. The tubes are connected in series to some form of collecting arrangement, e.g. a heat exchanger for heating water.

Through U.S. Pat. No. 3,048,375 a venetian blind-like heat control arrangement for windows is known. Each venetian blind slat contains tubes for a liquid heat transferring medium, said tubes at the same time forming pivot axis for the venetian blind slat. The tubes are connected in series to a heat collecting or heat emitting arrangement so that the temperature of the window surface can be controlled.

A further venetian blind type of solar energy collector is known through U.S. Pat. No. 4,002,159 which functions with a heat-absorptive surface of the blind.

A solar energy collector with foldable reflectors is furthermore known through U.S. Pat. No. 3,247,840.

One object of the present invention is to provide a solar collector of the kind stated initially, the effective time of operation and/or field of application of which is not limited to times during which direct sun radiation is incident.

A particular object of the invention is to provide a solar collector of the venetian blind type or the like, which combines the venetian blind function with a high efficiency of the solar collecting function.

The above and similar objects have been attained in that the walls of the reflectors are foldable about the respective conveying means.

Thus, it is possible to use the reflectors for energy collecting purposes both in cases of direct and indirect incident radiation, which will be apparent from the following description.

The invention will now be described more closely below while referring to one embodiment illustrated in the attached drawings.

In the accompanying drawings:

FIG. 1 is a front view of a preferred form of the invention illustrating a window design including a venetian blind formed as a solar collector.

FIG. 2 is a sectional view taken at section "II—II" in FIG. 1.

FIG. 3 is a vertical section of the embodiment of FIG. 1.

Figure 4:
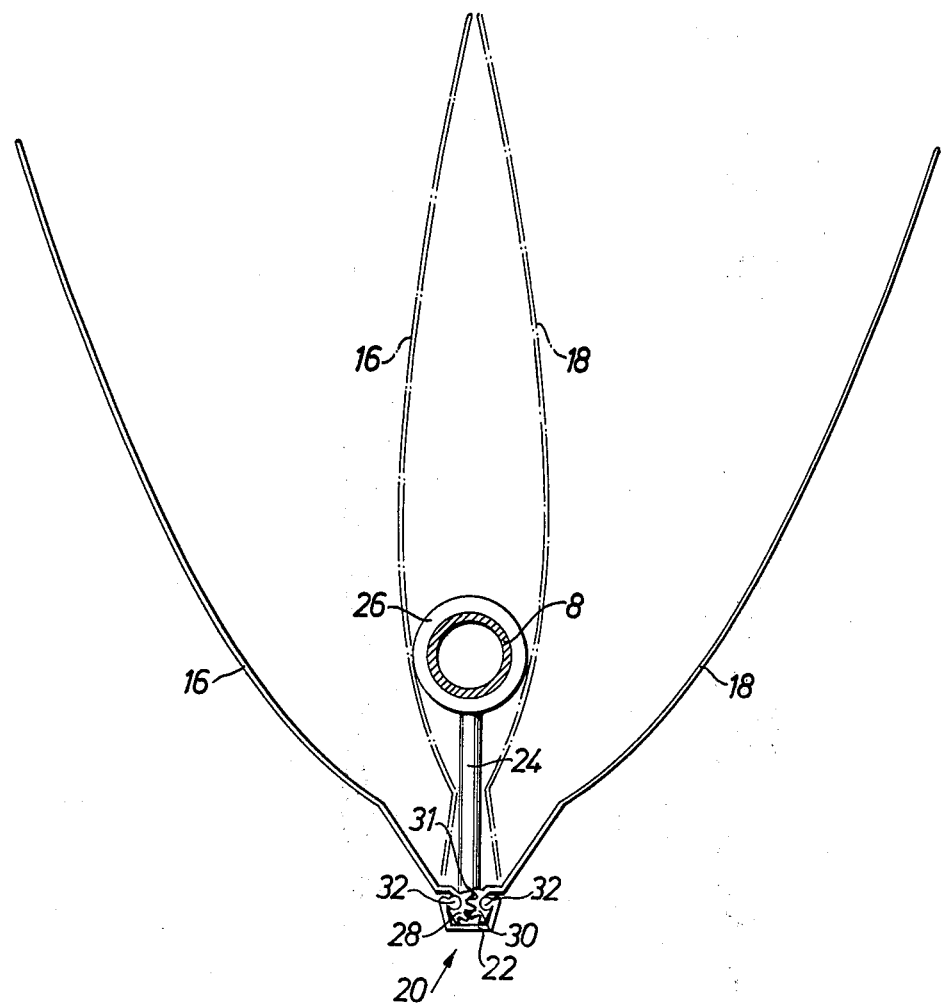
FIG. 4 is an end view of one of the solar energy collecting venetian blind slats.

The window illustrated in FIGS. 1–3 has a window sash 2, in which a double glass pane 4 is inserted on the side that shall face a room, and a single glass 6 is inserted on the outside. Between the glasses 4, on the one hand, and the glass 6, on the other hand, there is a space, in which a venetian blind designed as a solar energy collector, to be described more closely below, is arranged.

Between the opposite upright sides of the window sash a number of parallel tubes 8 extend. The tubes 8 are series connected via connecting tubes 10 extending in said upright sash sides. The tube system 8, 10 has a common inlet 12 and a common outlet 14. The inlet 12 and the outlet 14 are located in the pivot axis of the window and are intended to be connected via a rotatable coupling to connecting tubes opening in a corresponding window frame. The rotatable coupling and the window frame can be of a kind well known per se to an expert, and need therefore not be shown or described more closely here. The tube system 8–14 is intended to convey a liquid heat transferring medium and is connected to a heat collecting arrangement, which can be e.g. a heat exchanger for heating water.

The tubes 8 each pivotally carry a slat-reflector unit, the design of which appears from FIG. 4. More particularly this unit comprises two reflector wall portions 16 and 18. The wall portions 16 and 18 are pivotally interconnected along an elongated pivot means generally denoted 20, for movement between an unfolded condition, illustrated by full lines, and a folded condition illustrated by broken lines. In the unfolded condition the reflector portions 16 and 18 form a parabolic reflector, the inside of which is treated to obtain favorable reflecting properties. In the folded position the wall portions 16 and 18 define a shape essentially winglike in cross section, which encloses the tube 8, carrying the unit 16, 18.

A body portion 22, U-shaped in cross section, of the pivot means 20 is carried at one end of a number of pins 24 distributed along the tube 8. At their other ends the pins 24 are pivotally journalled on the tube 8 by means of an annular portion 26. The length of the pins 24 is such that the tube 8 is located in focus of the open parabolic reflector. The wall portions 16 and 18 at their mutually meeting longitudinal edges are interconnected by means of hinges. The hinges comprise ribs 28 and 30, respectively, having mutually engaging gear teeth 31. The U-shaped body portion 22 on the inside of both legs of the U has protrusions 32 partly circular in cross section. The protrusions 32 engage correspondingly shaped longitudinal recesses in the back side of the ribs 28, 30 so that a kind of "cylinder pivot" is formed between the protrusions 32 and the corresponding rib 28 and 30, respectively. By action of said "cylinder pivots" and the teeth engagement between the hinge ribs 28 and 30 a simultaneous and similar movement of the wall portions 16 and 18 can be attained in response to a force acting on either wall portion in either direction. This is used in a way to be described for the opening and closing of the wall portions 16 and 18.

more specifically a rod, indicated in FIG. 3 at 34, extends along one side of the window, and is movably guided in its length direction as is indicated by arrows 35. The rod 34 at 36 slidably engages with the adjacent end edge of the wall portion 16 of all reflector units. Said engagement 36 is slidable along said end edge of the wall portion 16, e.g. by it being formed by means of two pins extending perpendicularly inwardly from the rod and being slidable along the outside and inside, respectively, of the wall portion 16.

By shifting of the rod 34 and by virtue of the slidable engagement with the wall portions 16, a turning torque, on the one hand, can be applied to the reflector units about the corresponding tube 8 via the pins 24, and a pivoting torque, on the other hand, can be exerted on the wall portion 16 about the pivot 20. By the teeth engagement in the hinges 28, 30, 32 the last mentioned torque results in simultaneous and similar movement of the wall portions 16 and 18.

By suitable design of the included elements and their mutual cooperation, the movements of the reflector units caused by operating the rod 34 can be controlled in a desired way. This control can e.g. be such that the reflector units in their entirely open reflector condition can be turned about the tube 8 between a highest direction angle setting, corresponding to highest solstice, and a lowest direction angle setting, corresponding to the lowest solstice. The direction angle is designated α in FIG. 3. The operating rod 34 can then be motor controlled by e.g. a photocell device so that the direction angle α of the reflector units always corresponds to the solstice.

During said lowest direction angle setting said control can then be so designed that further movement downwards of the operating rod 34 causes folding of the reflector units besides the turning movement about the tube 8. This is accomplished by providing for a frictional resistance to the folding of the reflector units within the pivot structure 20 which exceeds any frictional resistance to the tilting of the units about the tubes 8. A mechanical stop (not shown) may be provided to limit the downward tilt of the reflectors to the lowest desired direction angle setting. During the movements of the reflector units described above the points of engagement 36 between the rod 34 and the wall portions 16 are, of course, moved depending upon the slope of the wall portions 16.

In connection with certain applications, which need not necessarily be in connection with venetian blind-like devices, the outsides of the wall portions 16, 18 or the like can be treated for the best possible absorption of diffused light. In the folded condition of the reflectors such a solar collector can thereby act as an energy collecting device also in cases when direct sun radiation is not present.

Another major advantage in closing the reflectors to the folded condition, is that the reflectors, together, provide a configuration which is very similar to a venetian blind slat, permitting substantial transmission of light into the room, as long as the folded wall portions are arranged more or less parallel to the direction of light reception. Thus, the structure may be referred to as a venetian blind which also operates as a solar collector.

I claim:

1. A solar collector combined within a window and including a plurality of elongated thinwalled reflectors arranged side by side and adjustable in direction and each designed to reflect incident radiation towards an associated longitudinal focus along which conveying means for a liquid heat transferring medium extends,
said conveying means being arranged to be connected to a heat collecting device,
the walls of each of the reflectors being foldable to surround the associated conveying means,
said conveying means for said respective reflectors comprising tubes arranged mutually parallel and extending between opposite sides of the window and being connected in series with a common outlet and a common inlet,
said common outlet and common inlet being positioned at a central pivot axis of the window for connection by means of rotatable couplings to connecting tubes for similar adjacent window frames.

2. A solar collector as claimed in claim 1 wherein the walls of each reflector consist of two wall portions which are pivotally interconnected along an elongated pivot means for movement between an unfolded reflector condition and a folded condition,
said wall portions defining an essentially winglike shape within which said conveying means are enclosed when said wall portions are in the folded condition.

3. A solar collector as claimed in claim 2 wherein said two wall portions of each reflector are interconnected at said pivot means by a position-determining interconnecting means operable to cause said wall portions to perform a simultaneous and similar movement at said pivot means to move simultaneously into the folded or unfolded positions.

4. A solar collector as claimed in claim 3 wherein said interconnecting means between said reflector wall portions comprises intermeshed gear teeth at the pivots of the respective wall portions.

5. A solar collector as claimed in claim 1 wherein means is provided for mounting each of said reflectors upon the associated conveying means and
said mounting means includes means to provide for rotation of each reflector about said conveying means as a turning axis in order to adjust the directional setting of each reflector.

6. A solar collector as claimed in claim 5 wherein said mounting means further comprises said pivot means which comprises a body portion, and interconnecting pins connecting said body portion of said pivot means to said conveying means.

7. A solar collector as claimed in any one of the preceding claims 1-6 wherein
said solar collector comprises a venetian blind structure wherein the foldable walls of said reflectors form the venetian blind slats and in which the folded condition of said reflectors provides the light transmitting condition of the venetian blind,
the unfolded position of the reflector walls providing the light obstructing condition of the venetian blind.

8. A solar collector as claimed in any one of the preceding claims 1-6 wherein
at least part of the outer surfaces of the reflector walls which remain exposed when the walls are in the folded condition are radiation absorbing.

9. A solar collector including a plurality of elongated thin-walled reflectors arranged side by side and adjustable in direction and each designed to reflect incident radiation towards an associated longitudinal focus along which conveying means for a liquid heat transferring medium extends,
said conveying means being arranged to be connected to a heat collecting device,
the walls of each of the reflectors being foldable to surround the associated conveying means,
the walls of each reflector consisting of two wall portions which are pivotally interconnected along an elongated pivot means for movement between an unfolded reflector condition and a folded condition,
said wall portions defining an essentially winglike shape within which said conveying means are enclosed when said wall portions are in the folded condition, said solar collector comprising a venetian blind structure wherein the foldable walls of said reflectors form the venetian blind slats and in which the folded condition of said reflectors provides the light transmitting condition of the venetian blind, the unfolded position of the reflector walls providing the light obstructing condition of the venetian blind.

10. A solar collector as claimed in claim 9 wherein said two wall portions of each reflector are interconnected at said pivot means by a position-determining interconnecting means operable to cause said wall portions to perform a simultaneous and similar movement at said pivot means to move simultaneously into the folded or unfolded positions.

11. A solar collector as claimed in claim 10 wherein said interconnecting means between said reflector wall portions comprises intermeshed gear teeth at the pivots of the respective wall portions.

12. A solar collector including a plurality of elongated thin-walled reflectors arranged side by side and adjustable in direction and each designed to reflect incident radiation towards an associated longitudinal focus along which conveying means for a liquid heat transferring medium extends, said conveying means being arranged to be connected to a heat collecting device, the walls of each of the reflectors being foldable to surround the associated conveying means, said solar collector comprising a venetian blind structure wherein the foldable walls of said reflectors form the venetian blind slats and in which the folded condition of said reflectors provides the light transmitting condition of the venetian blind, the unfolded position of the reflector walls providing the light obstructing condition of the venetian blind, and wherein means is provided for mounting each of said reflectors upon the associated conveying means and said mounting means includes means to provide for rotation of each reflector about said conveying means as a turning axis in order to adjust the directional setting of each reflector.

13. A solar collector as claimed in claim 12 wherein said mounting means further comprises said pivot means which comprises a body portion, and interconnecting pins connecting said body portion of said pivot means to said conveying means.

* * * * *